July 14, 1970    K. J. RICHARDS    3,520,739

FLAME CUTTING METALS

Filed March 11, 1968

INVENTOR
KENNETH J. RICHARDS
BY Charles A. Warren
ATTORNEY

3,520,739
FLAME CUTTING METALS
Kenneth J. Richards, North Sommers, Conn., assignor to United Aircraft Corporation, East Hartford, Conn., a corporation of Delaware
Filed Mar. 11, 1968, Ser. No. 712,218
Int. Cl. B23k 7/08
U.S. Cl. 148—9                                              5 Claims

ABSTRACT OF THE DISCLOSURE

In flame cutting metals, particularly the reactive metals, a starter strip of relatively thin material is positioned on the material to be cut in such a position that the start of the cut occurs in this strip.

BACKGROUND OF THE INVENTION

This invention relates to the flame cutting of metals and more particularly to the cutting of reactive metals such as titanium. The invention is especially adapted to an arrangement for starting the cut through the metal where the material to be cut is relatively thick.

One of the problems presented in cutting metal with a torch, such as an acetylene torch, is that the start of the cut in the part may be somewhat uneven and the surface of the cut may be relatively rough and extensively oxidized. This is particularly true in the case of the reactive metals which are prone to rapid oxidation. Further, if the preheat for the cut is concentrated on the top surface of a relatively thick material there may be some detrimental results on the top surface of the material. Any unnecessary dwell occurring in the start of a cut in the material will, of necessity, provide a fault or irregularity in the top surface or in the cut surface that will be objectionable if the material must later be machined at these surfaces. In much of the conventional flame cutting art and in the absence of special techniques, the cut surface will usually have an oxidized surface which is not only difficult to machine but which may be so deep that a substantial thickness of material must be machined off in order to completely remove the oxidized layer.

SUMMARY OF INVENTION

The principal feature of the invention is the use of a starter strip positioned on the material to be cut at the point where the cut is to begin so that, in effect, the start of the cut occurs in this starter strip.

In accordance with the present invention, with a starter strip which is relatively hin and so located that the initial heating and cutting occurs in this starter strip, there is no necessity for a dwell at the leading edge of the material to be cut, and the entire cutting process can be carried on with the torch moving at such a rate as to permit most efficient cutting of the material. The starter strip also permits the cutting rate at the first flame contact with the basic material to be sufficiently high as to produce a relatively thin and readily removable oxide layer on the cut surface.

DESCRIPTION OF THE PREFERRED EMBODIMENT

Figure 1:
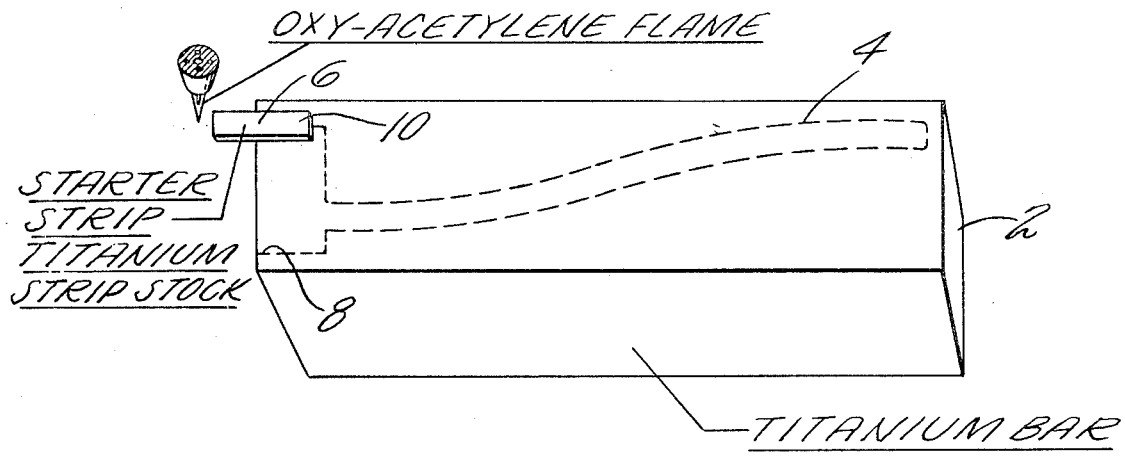
FIG. 1 is a diagrammatic view showing a starter strip in position on a piece of material to be flame cut.

With reference to the drawing, the block 2 represents a relatively thick workpiece or block from which the shape represented by the dotted line 4 is to be cut. Obviously, there is a starting point 6 at which the cut in the workpiece will be started and a terminal point 8.

Figure 2:
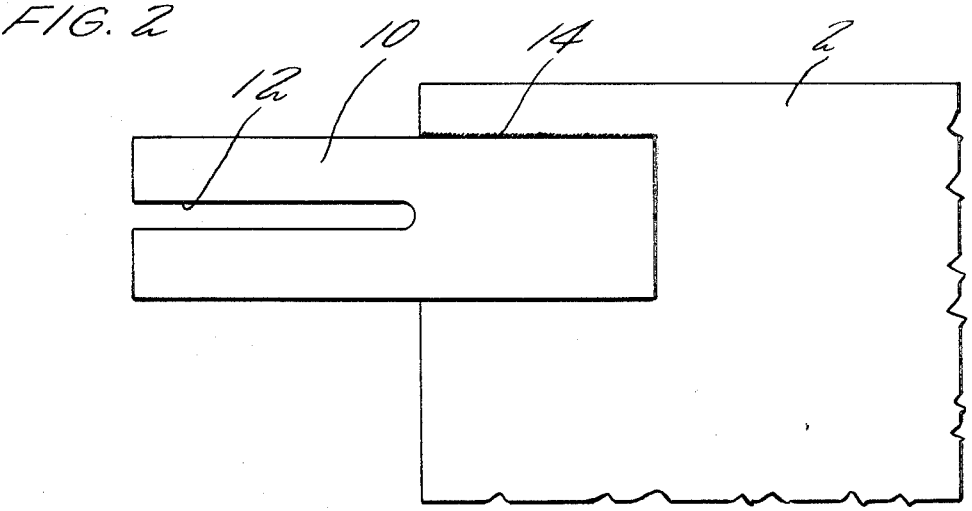
FIG. 2 is an enlarged plan view of the starter strip on the workpiece.

In accordance with the invention, the point 6 at which the cut is to be started in the stock or workpiece has a starter strip 10 positioned thereover and extending outwardly beyond the edge of the block to be cut. In the particular arrangement shown the thickness of the block which is to be cut with the torch is 8½ inches, the starter strip is from .050 inch to .090 inch thick and the overlap of the starter strip beyond the edge of the block is about ½ inch. The starter strip is enough wider than the width of the cut made so that the cut will not extend over more than about ⅓ of the width of the strip. Thus, the cut as it starts is represented by the notch 12, FIG. 2. The width of the cut, or kerf, in the starter strip and in the workpiece is typically ³⁄₁₆–¼ inch, although this varies with cutting tip size, gas pressures, material composition and thickness, and operator technique.

The torch used in cutting may be a conventional flame type of torch but when the material to be cut is titanium or a titanium alloy or similar metals, the torch is preferably a modified oxyacetylene torch. One torch that might be used, for example, is an A. O. Smith cutting torch Model SC–781 with a cutting tip such as the A. O. Smith Model SC 12–7 modified to provide four preheating holes each .046 inch in diameter with a central oxygen cutting orifice that is .140 inch in diameter. More details of torches that are suitable for this purpose are described in applicant's copending application, Ser. No. 712,219, filed Mar. 11, 1968, which is directed to a particular process for cutting titanium or similar metals and alloys.

In operation, the torch is put in operation and the cutting process is begun at the leading edge of the starter strip 10. Since the starter strip is relatively thin, only a small amount of preheat is required and the cut proceeds through the starter strip. It has been found that when the torch reaches the leading edge of the block in which the deep cut is to be formed, there is adequate preheat at the cutting point so that the cutting procedure may continue directly into and through the thick stock with no change in the rate of motion of the torch. Obviously the starter strip may be fastened to the surface of the block in any suitable way. In some instances the starter strip is held by a weld 14 along the outer edge thereof. In other cases, a mechanical clip or spring has been utilized for this purpose. The prime intent is to provide thermal contact at the workpiece. For some purposes, a mechanical connection is preferred particularly as it permits the starter strip to be stripped away from the workpiece after the workpiece cutting has commenced. At this point, the starter strip has performed its function and can be removed before it becomes integrally bound to the surface of the block.

In the cutting process an excess of oxygen is supplied to the torch. For example, in cutting a 6 inch thick block of titanium, during the preheat cycle, oxygen is supplied at a pressure of 20 p.s.i. and a flow rate of 15 as measured by a Mogul Dual Flowmeter FM–2, and acetylene is supplied at 6 p.s.i. and a flow rate of 25. Cutting oxygen is supplied at a pressure of 120–125 p.s.i. The torch is adjusted so that the preheat flame is visible about ³⁄₁₆ inch from the tip of the torch and the cutting rate is about 24 inches/minute.

Under these conditions, the oxide layer formed on the cut surface is relatively thin, typically a maximum of about .030 inch, and sufficiently brittle to be readily removed by dry grit blasting.

It is to be understood that the invention is not limited to the specific embodiments herein illustrated and described, but may be used in other ways without departure from its spirit as defined by the following claims.

I claim:
1. In flame cutting relatively thick metal stock, the steps of providing a thin starter strip of substantially the same material as the stock and overhanging the edge of the stock at the point where the cut is to be started and beginning the cut in this strip.
2. The process according to claim 1 wherein the metal stock is a reactive metal stock.
3. The process as set forth in claim 1 in which the starter strip is wider than the effective width of the cut.
4. The process as in claim 1 in which the starter strip is relatively thin to minimize the preheat in the flame at the start of the cut in the starter strip.
5. In oxy-aceylene flame cutting of titanium or titanium alloy workpieces, the improvement which comprises positioning a titanium starter strip on the surface of the workpiece and overhanging the edge of the workpiece at the point where the flame cutting is to begin and beginning the cutting in this starter strip thereby eliminating torch dwell on the workpiece at the start of the cutting operation.

References Cited

UNITED STATES PATENTS 2,309,096   1/1943   Bucknam et al. _____ 148—9.5

L. DEWAYNE RUTLEDGE, Primary Examiner

W. W. STALLARD, Assistant Examiner